(12) United States Patent
Simon (10) Patent No.: US 11,208,169 B2
(45) Date of Patent: Dec. 28, 2021

(54) MOTORIZED VEHICLE COMPRISING A CONNECTED FORK CROWN

(71) Applicant: IRIDER, Le Mans (FR)

(72) Inventor: Jean-Francois Simon, Arnage (FR)

(73) Assignee: IRIDER, Le Mans (FR)

( * ) Notice: Subject to any disclaimer, the term of this patent is extended or adjusted under 35 U.S.C. 154(b) by 202 days.

(21) Appl. No.: 16/491,426

(22) PCT Filed: Feb. 27, 2018

(86) PCT No.: PCT/FR2018/050462
§ 371 (c)(1),
(2) Date: Sep. 5, 2019

(87) PCT Pub. No.: WO2018/162820
PCT Pub. Date: Sep. 13, 2018

(65) Prior Publication Data
US 2020/0023920 A1     Jan. 23, 2020

(30) Foreign Application Priority Data

Mar. 6, 2017 (FR) ...................................... 1751802

(51) Int. Cl.
*B62J 99/00* (2020.01)
*B62K 21/02* (2006.01)
(Continued)

(52) U.S. Cl.
CPC ............... *B62J 99/00* (2013.01); *B62K 21/02* (2013.01); *B62K 21/04* (2013.01); *G07C 5/085* (2013.01);
(Continued)

(58) Field of Classification Search
CPC ... B62J 99/00; B62J 45/42; B62J 45/41; B62J 45/00; B62J 45/10; B62J 45/20;
(Continued)

(56) References Cited

U.S. PATENT DOCUMENTS 4,687,072 A * 8/1987 Komuro ................. B60K 37/02
                                                              180/219
D437,571 S * 2/2001 Mason .......................... D12/118
(Continued)

FOREIGN PATENT DOCUMENTS

CN       101200212 A    6/2008
EP        1439101 A1    7/2004

OTHER PUBLICATIONS

International Search Report and English translation of the Written Opinion of the International Searching Authority dated May 31, 2018, for corresponding International Application No. PCT/FR2018/050462, filed. Feb. 27, 2018.
(Continued)

*Primary Examiner* — Tony H Winner
*Assistant Examiner* — Marlon A Arce
(74) *Attorney, Agent, or Firm* — David D. Brush; Westman, Champlin & Koehler, P.A.

(57) ABSTRACT

A motorized vehicle including: a front fork; a steering shaft able to rotate inside a steering column; at least one fork crown coupled to the steering shaft and to the front fork; and at least one electronic component intended to collect and/or transmit data relating to the operation of the motorised vehicle. The fork crown has a body in which there is formed a cavity closed by a cover and an electronic board housed in the cavity and able to centralize and/or process the data supplied by the at least one electronic component.

8 Claims, 7 Drawing Sheets

(51) Int. Cl.
  *B62K 21/04* (2006.01)
  *G07C 5/08* (2006.01)
  *B60R 11/04* (2006.01)
  *B62J 11/00* (2020.01)
  *G08B 13/22* (2006.01)
  *H04L 29/08* (2006.01)
  *B62J 45/20* (2020.01)
  *B62J 45/40* (2020.01)

(52) U.S. Cl.
  CPC .............. *B60R 11/04* (2013.01); *B62J 11/00* (2013.01); *B62J 45/20* (2020.02); *B62J 45/40* (2020.02); *G08B 13/22* (2013.01); *H04L 67/12* (2013.01)

(58) Field of Classification Search
  CPC ........... B62J 45/40; B62J 11/00; B62K 21/02; B62K 21/04; G07C 5/085; B60R 11/04; G08B 13/22; G08B 21/0283; G08B 13/1436; H04L 67/12
  See application file for complete search history.

(56) References Cited

U.S. PATENT DOCUMENTS

| | | | |
|---|---|---|---|
| 6,976,691 B1 | 12/2005 | Song et al. | |
| D683,664 S * | 6/2013 | Eder | D12/118 |
| 9,821,876 B2 * | 11/2017 | Grobner | B62K 21/04 |
| 2002/0039951 A1 * | 4/2002 | Hasegawa | B62J 27/00 |
| | | | 477/183 |
| 2008/0246250 A1 | 10/2008 | Lacour | |
| 2013/0205175 A1 * | 8/2013 | Yamada | H04L 41/0631 |
| | | | 714/57 |

OTHER PUBLICATIONS

International Search Report dated May 31, 2018 for International Application No. PCT/FR2018/050462, filed on Feb. 27, 2018.
Written Opinion of the International Searching Authority dated Sep. 13, 2018 for corresponding International Application No. PCT/FR2018/050462, filed on Feb. 27, 2018.

* cited by examiner

MOTORIZED VEHICLE COMPRISING A CONNECTED FORK CROWN

CROSS-REFERENCE TO RELATED APPLICATIONS

This Application is a Section 371 National Stage Application of International Application No. PCT/FR2018/050462, filed Feb. 27, 2018, the content of which is incorporated herein by reference in its entirety, and published as WO 2018/162820 on Sep. 13, 2018, not in English.

FIELD OF THE DISCLOSURE

The field of the invention is that of designing and producing motorised vehicle equipment. The invention more specifically relates to the integration of an electronic system on a motorised vehicle comprising a fork crown.

BACKGROUND OF THE DISCLOSURE

A motorised vehicle comprising a fork crown corresponds to a motorcycle (motorbike or scooter), a watercraft or also a snowmobile.

A motorcycle is a motorised vehicle, without bodywork, with two wheels. According to a conventional design, a motorcycle comprises a frame on which are coupled at least one front wheel and at least one rear wheel by way of suspension and/or steering systems.

At the level of the front portion of the motorcycle, the front wheel is coupled with a fork connected to the frame of the motorcycle by a steering shaft and a steering column.

The front fork of the motorcycle comprises two fork tubes maintained in position against one another by way of two fork crowns, the fork crowns being secured to the steering shaft positioned centrally on the fork crowns. This steering shaft is intended to be able to rotate inside the steering column which is secured to the frame of the motorcycle.

According to the different technological advances, the equipment and the functionalities of motorcycles have developed.

For example, the braking devices of motorcycles are provided with braking assistance systems, and in particular, wheel anti-locking systems.

According to another example, motorcycles can also be provided with diagnostic sockets coupled with an embedded computerised unit. These diagnostic sockets make it possible to electronically control the functioning of the motorcycle, and, if needed, to modify the performance of the members of the motorcycle.

In another way, new information and digital technologies have made it possible to create vehicles integrating computerised systems which bring new functionalities and information to drivers and/or to occupants of these vehicles.

According to this approach, these technologies make it possible to obtain so-called "connected" vehicles.

For example, a connected car can be provided with an electronic system being coupled to communication networks, as well as the smartphone of the driver, so as to be able to extend the capacities of the car and to improve the driving experience of the driver.

By considering these technological advances, motorcycle drivers can thus have an expectation concerning the integration of these new information technologies in the motorcycle thereof.

The expectation of integrating these new technologies can however clash with the absence of bodywork of motorcycles, as well as the desire of motorcycle drivers to have vehicles which are pleasant to look at. Consequently, adding unsightly external elements to a motorcycle, for example a casing intended to comprise electronic elements, would lead to a disadvantage likely to limit the adoption of new technologies.

SUMMARY

An exemplary embodiment of the invention relates to a motorised vehicle comprising:
- a front fork;
- a steering shaft able to rotate inside a steering column;
- at least one fork crown coupled to the steering shaft and to the front fork;
- at least one electronic component intended to collect and/or transmit data relating to the operation of the motorised vehicle, characterised in that the fork crown has a body in which there is formed a cavity closed by a cover, and in that it comprises an electronic board housed in the cavity and able to centralise and/or process data supplied by said electronic component(s), and in that the electronic board comprises control means coupled with at least one member of the motorised vehicle, the control vehicles being able to start, and/or stop and/or modify the performance of the member from the electronic board.

Preferably, the motorised vehicle is a motorcycle. An exemplary embodiment of the invention can also be applied to a watercraft or also a snowmobile.

Such a motorised vehicle according to an exemplary embodiment of the invention makes it possible to meet the expectation of integrating new electronic technologies on a motorised vehicle, while offering a solution which does not impact or has little impact on the appearance of the motorised vehicle.

Indeed, thanks to the fork crown which houses an electronic board, the motorised vehicle can benefit from new technologies thanks to the functionalities offered by the electronic board which will centralise and/or process data supplied by one or more electronic components located on the motorised vehicle, these electronic components making it possible to collect and/or transmit data relating to the operation of the motorised vehicle.

In the case where the motorised vehicle is a motorcycle, the integration of the electronic board inside a cavity arranged in the body of the fork crown makes it possible to avoid adding to the motorcycle, an additional casing which would be located on an external portion of the motorcycle, and which could be unsightly to the eyes of the owner of the motorcycle and other people.

The control means confer to the electronic board, the capacity to trigger certain functions of the motorised vehicle.

For example, in the scope of an instruction sent by the owner of the motorised vehicle to the electronic board, the latter can trigger the starting of the motorised vehicle.

These control means can also, according to another application example, where the motorised vehicle is a motorcycle, make it possible for the triggering of other members of the motorcycle, such as the headlights, the hazard lights, etc.

According to an advantageous embodiment, the electronic board comprises means for exchanging data with an external computerised unit.

Such means for exchanging data with an external information unit can take the form of communication modules, of the type:
- using a communication standard (Bluetooth) making it possible for a two-directional close-up range data exchange;
- using one or more broadband mobile telephone networks to exchange data;
- using a narrowband, energy-saving cell network, of the type used to constitute "the Internet of Things" (technology developed under the brand, "SIGFOX").

These modules thus make it possible for the electronic board to exchange data, for example over a narrowband cell network with a computerised server, or via a close-up range connection with a smartphone which could be that of the driver of the motorised vehicle.

Thanks to this embodiment, the driver of the motorised vehicle benefits from data processed and centralised by the electronic board which would be collected by one of the electronic components of the motorised vehicle.

Advantageously, the electronic board comprises geolocation means.

Thanks to such geolocation means, the electronic board can centralise and/or process geolocation data and thus enrich the functionalities offered by the electronic board.

For example, in the scope of a solution where the electronic board comprises an alarm function, and combined with the means for exchanging data with an external computerised unit, the electronic board can act as a silent alarm. For this function, the electronic board can transmit geolocation data of the motorised vehicle following the detection of certain pre-programmed events associated with an attempt of theft or damage.

According to an advantageous feature, the electronic board comprises an accelerometer.

Thanks to the accelerometer, the electronic board makes it possible to centralise and process data relating to changes in position of the motorised vehicle and/or to vibrations and/or to impacts.

The accelerometer makes it possible to enrich the data processed by the electronic board. It also makes it possible to improve an alarm function of the electronic board. In other words, and for example, in the case where the motorised vehicle is a motorcycle, the accelerometer can detect a fall of the motorcycle, the movement thereof, or also the lifting thereof.

Advantageously, the motorised vehicle comprises means for electrically connecting the electronic board to an electrical supply circuit of the motorised vehicle.

These electrical connection means make it possible to supply the electronic board from the battery and/or the alternator of the motorised vehicle.

According to a preferable feature, the motorised vehicle comprises an emergency battery housed in the cavity, the emergency battery being intended to electrically supply the electronic board.

Such an emergency battery electrically supplying the electronic board makes it possible to avoid, at least temporarily, a supply from the battery of the motorised vehicle.

In the case where the electronic board housed in the cavity comprises an alarm function, the electronic board is thus independent from the electrical supply circuit or the motorised vehicle. In other words, if people wanting to steal the motorised vehicle disconnect the battery from the motorised vehicle to seek to deactivate the alarm, the alarm (formed, as a minimum, by the joining of the electronic board and of the emergency battery housed in the cavity) will not be impacted by the action of these people.

Preferably, the electronic component belongs to the following group:
- speed sensor;
- petrol level sensor;
- neutral contactor sensor;
- connector to a diagnostic socket of an embedded computerised unit of the motorised vehicle.

According to an exemplary embodiment of the invention, the body of the fork crown is single-piece, the body having two housings for coupling and clamping fork tubes, the cavity being located between the coupling and clamping housings.

Such a design of the fork crown makes it possible to optimise the placement of the cavity and to limit the visual modifications resulting from adding the cavity in the fork crown with respect to a conventional fork crown.

Advantageously, the motorised vehicle comprise a camera integrated in the fork crown and coupled to the electronic board.

Such a camera advantageously enriches the functionalities offered by the fork crown of the motorised vehicle according to an exemplary embodiment of the invention.

BRIEF DESCRIPTION OF THE DRAWINGS

Other features and advantages of the invention will appear more clearly upon reading the following description of two embodiments of the invention, given as illustrative and non-limiting examples, and appended drawings from among which.

DETAILED DESCRIPTION OF ILLUSTRATIVE EMBODIMENTS

Figure 1:
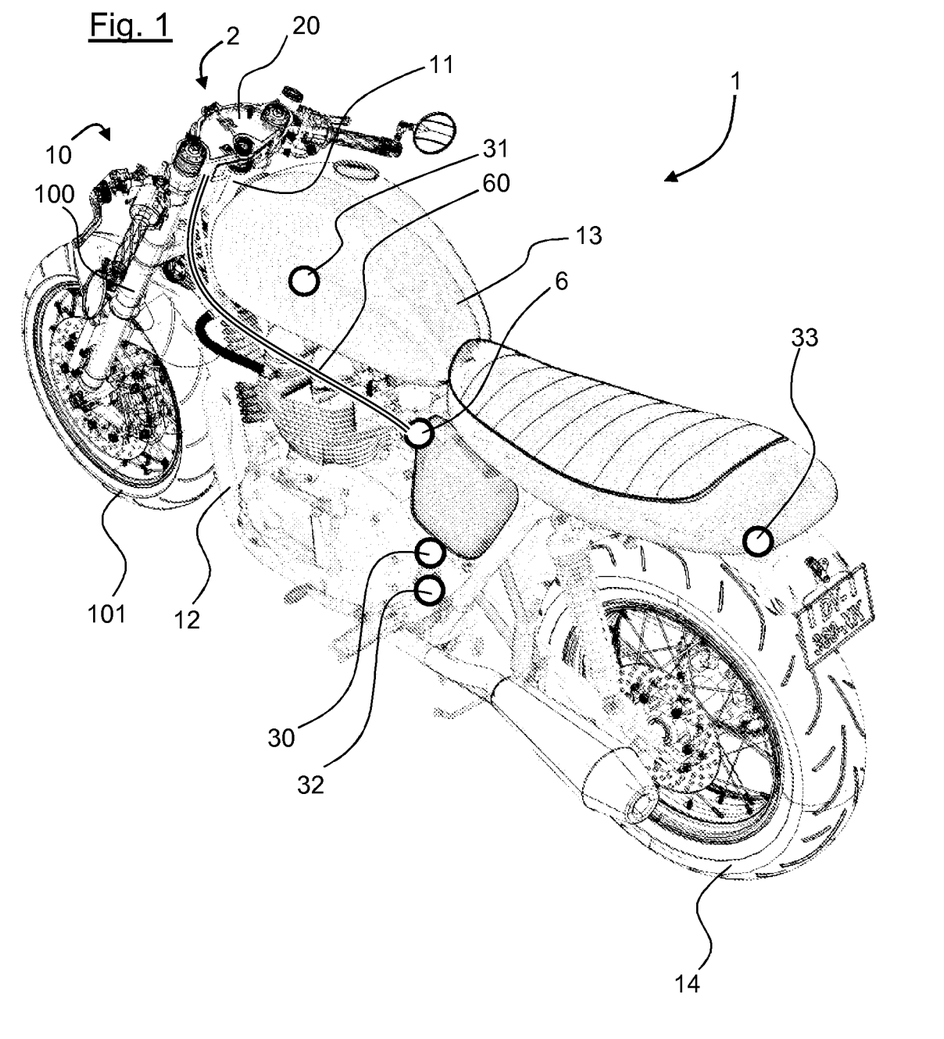
FIG. 1 is a schematic representation of a motorised vehicle (a motorcycle) according to an exemplary embodiment of the invention.

In reference to FIG. 1, the motorised vehicle 1 is a motorcycle. This motorised vehicle comprises:
- a frame 12 supporting members of the motorcycle, such as, among other things, the engine, the tank 13, or also the seat;

a front fork 10 coupling the front wheel 101 to the frame 12;

a real wheel 14.

More specifically, the front fork 10 couples the front wheel 101 to the frame 12 by way of two fork tubes 100 secured together by way of a fork crown system (of which one lower fork crown and one upper fork crown 2). The fork crowns surround and hold in place a steering shaft positioned centrally with respect to the crown. This steering shaft is mounted able to rotate inside a steering column 11 secured to the frame 12.

According to the principle of an exemplary embodiment of the invention and such as illustrated by FIGS. 1, 2, 3 and 5, the upper fork crown 2 has a body 20 in which there is formed a cavity 21. In reference to FIG. 4, the cavity of the body 20 is intended to be closed by a cover 22.

Such as is subsequently explained in more detail, the cavity 21 houses an electronic board able to centralise and/or process data supplied by at least one electronic component intended to collect and/or transmit data relating to the operation of the motorised vehicle.

Indeed, such as illustrated by FIG. 1, the motorised vehicle (the motorcycle) comprises electronic components which collect and/or transmit data relating to the operation of the motorcycle. The motorised vehicle 1 in particular comprises, as electronic components:

a speed sensor 30;
a petrol level sensor 31, coupled to the tank 13;
a neutral contactor sensor 32;
a connector 33 to a diagnostic socket of an embedded computerised unit of the motorised vehicle.

Figures 2, 3:
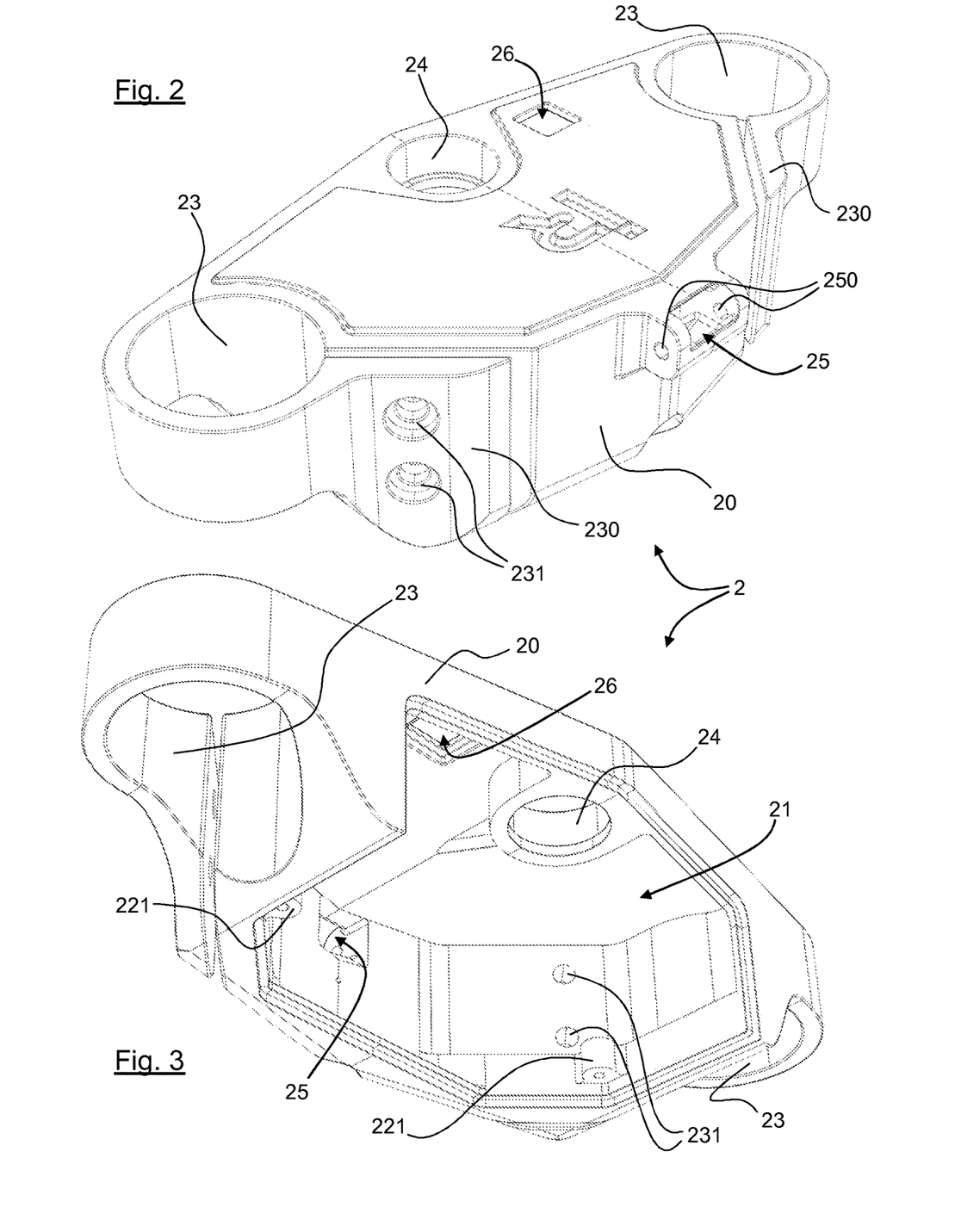
FIGS. 2 and 3 are schematic representations according to perspective views of the body of a fork crown according to a first embodiment.
Figure 4:
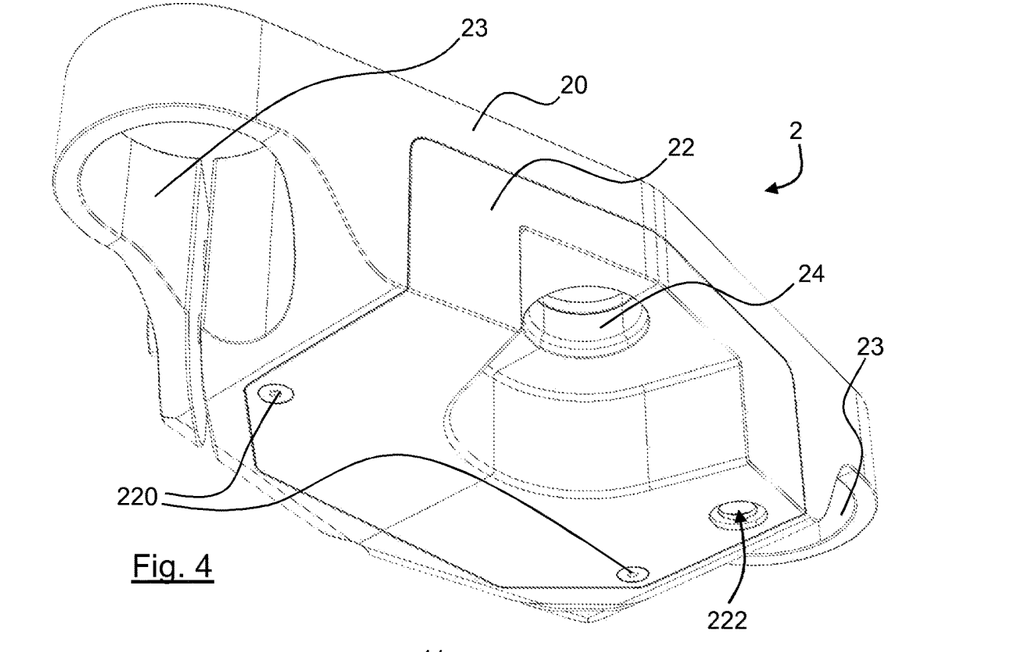
FIG. 4 is a schematic representation according to a perspective view of a fork crown, according to the first embodiment, with the cover closing the cavity of the body.

In reference to FIGS. 2, 3 and 4, the fork crown 2 according to an exemplary embodiment of the invention comprises two elements of which a body 20 which is single-piece and a cover 22. The body and the cover are preferably made of aluminium.

The body 20 has two coupling and clamping housings 23 intended to receive the fork tubes 100.

In reference to FIG. 3 and according to the first embodiment, the cavity 21 is located between the coupling and clamping housings.

In reference to FIGS. 2, 3 and 4, the fork crown 2 also has a means for coupling 24 to the steering shaft. This coupling means 24 is formed by the joining of the body 20 and of the cover 22.

According to FIGS. 2 and 3, the body 20, in complement to the coupling and clamping housings 23, has two clamping pads 230, each intended to be re-clamped onto the body by way of complementary screws of two tapped holes 231 located on these clamping pads. By screwing the complementary screws in the two tapped screws, the fork tubes previously inserted in the coupling and clamping housings 23 are surrounded.

Figure 6:
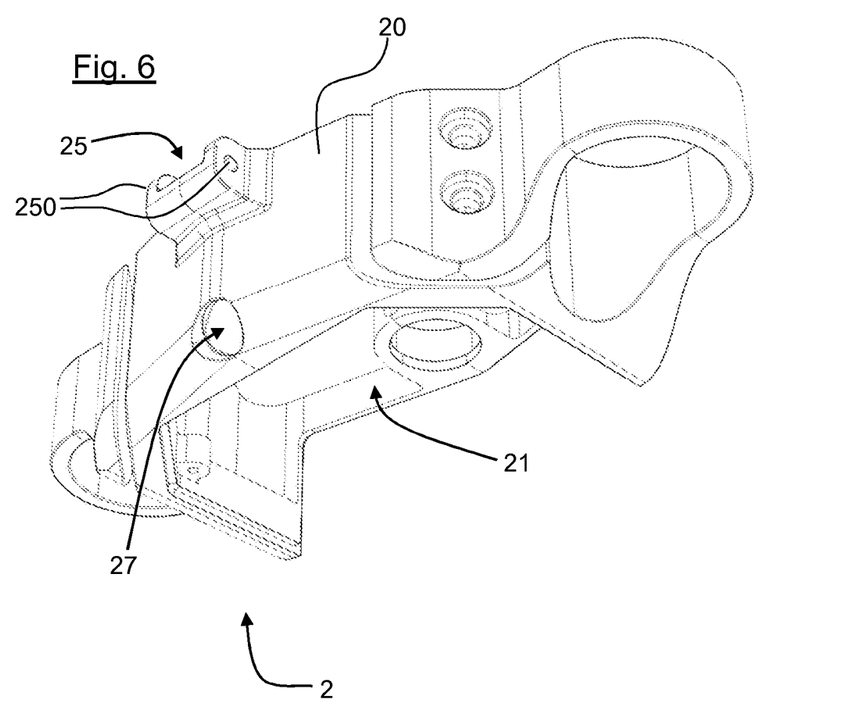
FIG. 6 is a schematic representation according to a perspective view of the body of the fork crown, according to the first embodiment, illustrating the front face of the fork crown.

Such as illustrated by FIGS. 2, 3 and 6, the body 20 also has:

a first communication space 25 with a space located in front and above the fork crown, the fork crown comprising, at the level of this second communication space, an excrescence with means for fixing 250 to a complementary member;
a second communication passage 26 with a space located above the body 20 of the fork crown 2;
a third communication passage 27 with a space located at the front and below the fork crown, the fork crown comprising, at the level of this third communication space, a camera 270 intended to film towards the front of the motorised vehicle.

The complementary member, intended to be coupled to the fixing means 250 located on the excrescence, can for example correspond to a rev counter, a front headlight or also a motorcycle bubble.

Such as illustrated by FIGS. 3 and 4, the cover 22 is coupled on the body 20 using complementary screws 220 with tapped holes located on fixing pads 221 of the body 20 of the fork crown 2.

In reference to FIG. 4, the cover 22 has a communication opening 222 in particular able to let connection cables intended to connect the electronic board to the electronic components located on the motorised vehicle pass through.

Figure 5:
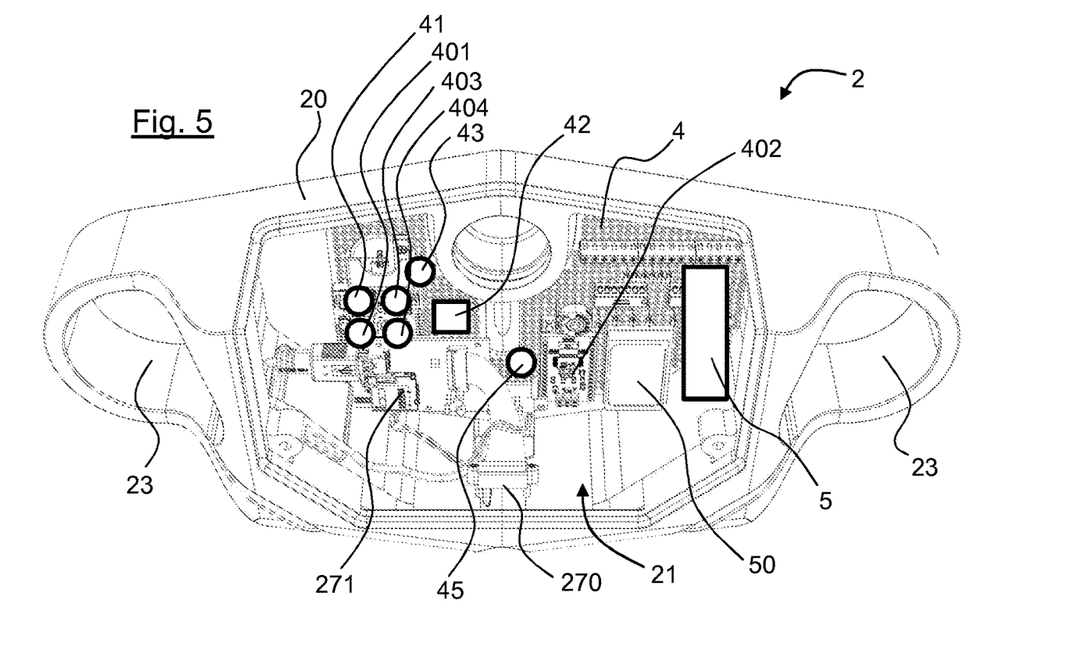
FIG. 5 is a schematic representation according to a bottom view of the body of the fork crown, according to the first embodiment, housing the electronic board.

According to FIG. 5, and such as mentioned above, the motorised vehicle comprises an electronic board 4 which is housed in the cavity 21 arranged in the body 20 of the fork crown 2.

This electronic board 4 is intended to centralise and/or process data supplied by the electronic components cited above.

The electronic board 4 comprises:

means for exchanging data with an external computerised unit;
geolocation means 41;
an accelerometer 42;
control means 43 coupled with members of the motorised vehicle.

Data exchange means correspond with:

a broadband communication module 401 being connected to broadband cell networks;
a narrowband and low consumption communication module 402 being connected to a narrowband cell network;
a radio wave, close-range communication module 402;
a wireless communication module 404, able to create a computerised network between external computerised units (smartphone, computer, etc.).

The control means 43 make it possible for the electronic board 4 to start, stop or modify the performance of a member of the motorised vehicle. According to an application example, following an instruction to preheat the engine sent to the electronic board 4, the latter can trigger the starting of the motorised vehicle.

In reference to FIG. 1, the motorised vehicle 1 (the motorcycle) can comprise means for electrically connecting 60 the electronic board 4 to an electrical supply circuit 6 of the motorised vehicle. This electrical supply circuit of the motorised vehicle integrates, for example, a battery and an alternator.

According to FIG. 5, the motorised vehicle comprises an emergency battery 5 which is housed in the cavity 21 of the fork crown 2. This battery is intended to electrically supply the electronic board 4 by way of a power transformer 50.

In case of an electricity provision failure from the electrical supply circuit of the motorised vehicle, the emergency battery 5 can bridge and continue to supply the electronic board located in the cavity of the body of the fork crown.

Thanks to these components and according to this embodiment where the motorised vehicle is a motorcycle, the electronic board can achieve a geolocation of the motorcycle. This geolocation makes it possible to monitor the motorbike in real time. In case of suspecting a theft of the motorbike, an alert is sent to the driver, and a silent monitoring of the motorcycle can be achieved thanks to the sending of a signal over the narrowband cell network.

The electronic board located in the fork crown can also achieve an automatic detection of the status of the motorised vehicle (stopped, started, or moving, etc.) and makes it possible to adapt, according to the pre-set parameters, the functionalities available to the driver of the motorised vehicle.

Thanks to the wireless communication module able to create a computerised network, the driver can also connect this computerised equipment to a private Wi-Fi network generated by the electronic board located in the fork crown.

The electronic board located in the fork crown can also act as a virtual key using the control means thereof. Indeed, the driver can start and stop the vehicle from:
- an app present on their telephone;
- through their voice (detected, for example, by their telephone);
- from a smartwatch.

In reference to FIG. 5, the cavity 21 can also comprise a memory 45. This memory makes it possible to store data collected and/or transmitted by the electronic components.

Such as mentioned above, the motorised vehicle also comprises a camera 270. In reference to FIG. 5, this camera 270 is integrated in the fork crown 2.

More specifically, a camera lens which passes through the third communication passage presented by the fork crown is observed, and the electronic board 4 comprises a camera controller 271 coupled with this camera lens.

According to an application example, the camera and the memory make it possible to store photos or videos of a motorised vehicle path.

Finally, such as mentioned above, the accelerometer also makes it possible for the fork crown and for the electronic board to have fall and/or theft detection functions. More specifically, dangerous events for the motorised vehicle can be detected, that is:
- a fall;
- a movement of the motorcycle;
- a lifting of the motorcycle;
- etc.

In reference to FIGS. 7 to 10, a second embodiment of the fork crown is described below.

The upper fork crown 2 has a body 20.

This body 20 has a cavity 21. The cavity is closed by a cover 22.

The body 20 also comprises:
- coupling and clamping housing 23 intended to receive fork tubes 100;
- a means for coupling 24 to the steering shaft.

Different from the first embodiment, the body 20 has a cavity 21 which is not located between the coupling and clamping housings 23.

Indeed, the cavity 21 is positioned offset with respect to a central portion 200 of the fork crown 2.

More specifically, according to this embodiment, the body 20 of the fork crown 2 comprises:
- a central portion 200, having coupling and clamping housings 23 as well as the means for coupling 24 to the steering shaft;
- a remote portion 201, having the cavity 21;
- an arm 202 coupling the remote portion 201 to the central portion 200.

Preferably, the central portion 200, the remote portion 201 and the arm 202 form a single-piece assembly.

This body 20 is advantageously made of aluminium.

The remote portion 201 is intended to be located at the front of the fork crown 2.

According to the present embodiment illustrated by FIGS. 7 to 10, the cover 22 takes a tank form. In this manner, the cavity arranged in the body 20 of the fork crown, the more specifically in the remote portion 201 of the body 20, has a significant volume when the cover 22 closes the cavity 21.

Figure 10:
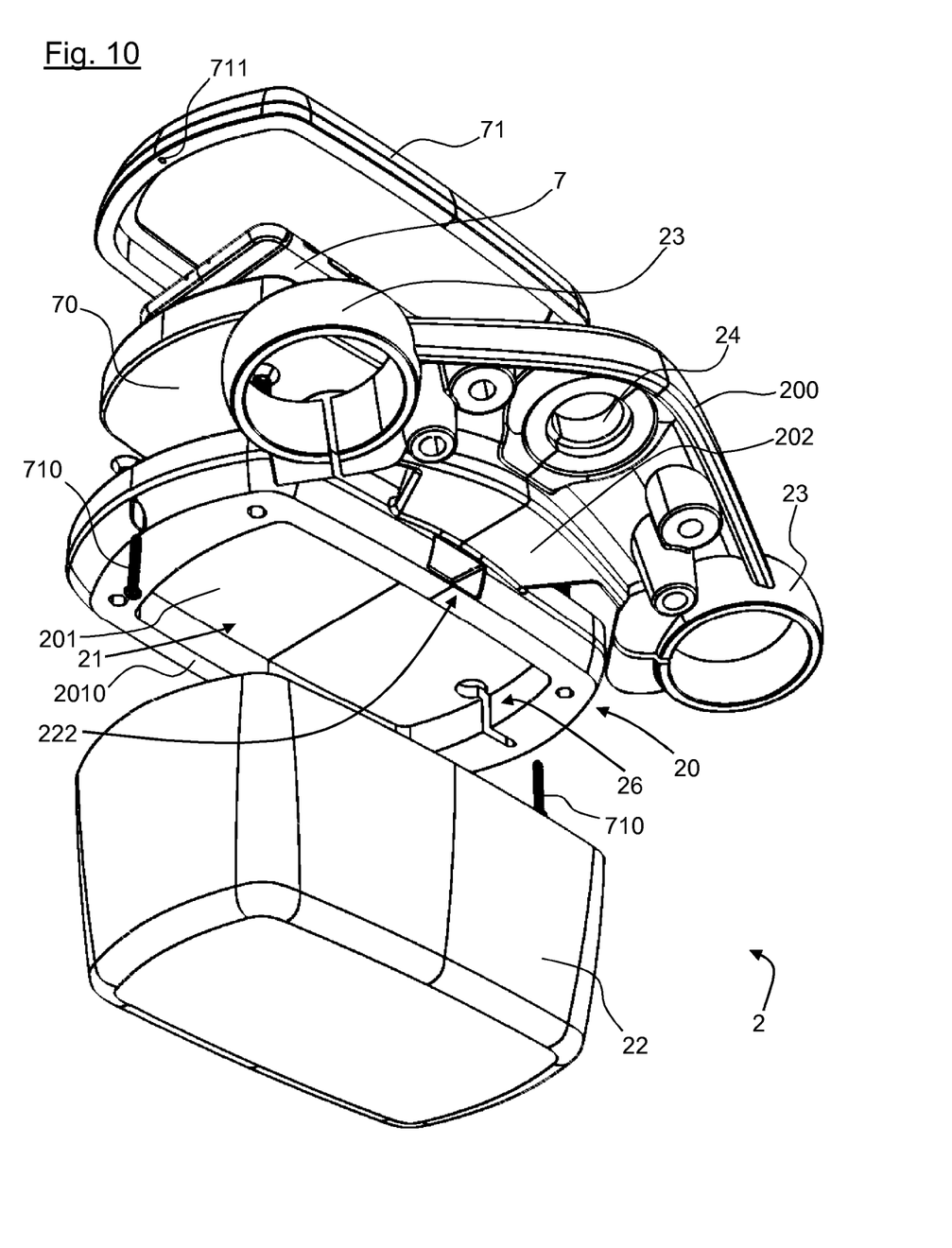

In reference to FIG. 10, the remote portion 201 of the body 20 of the fork crown 2 has a complementary lower peripheral edge 2010 of the cover 22.

Figure 9:
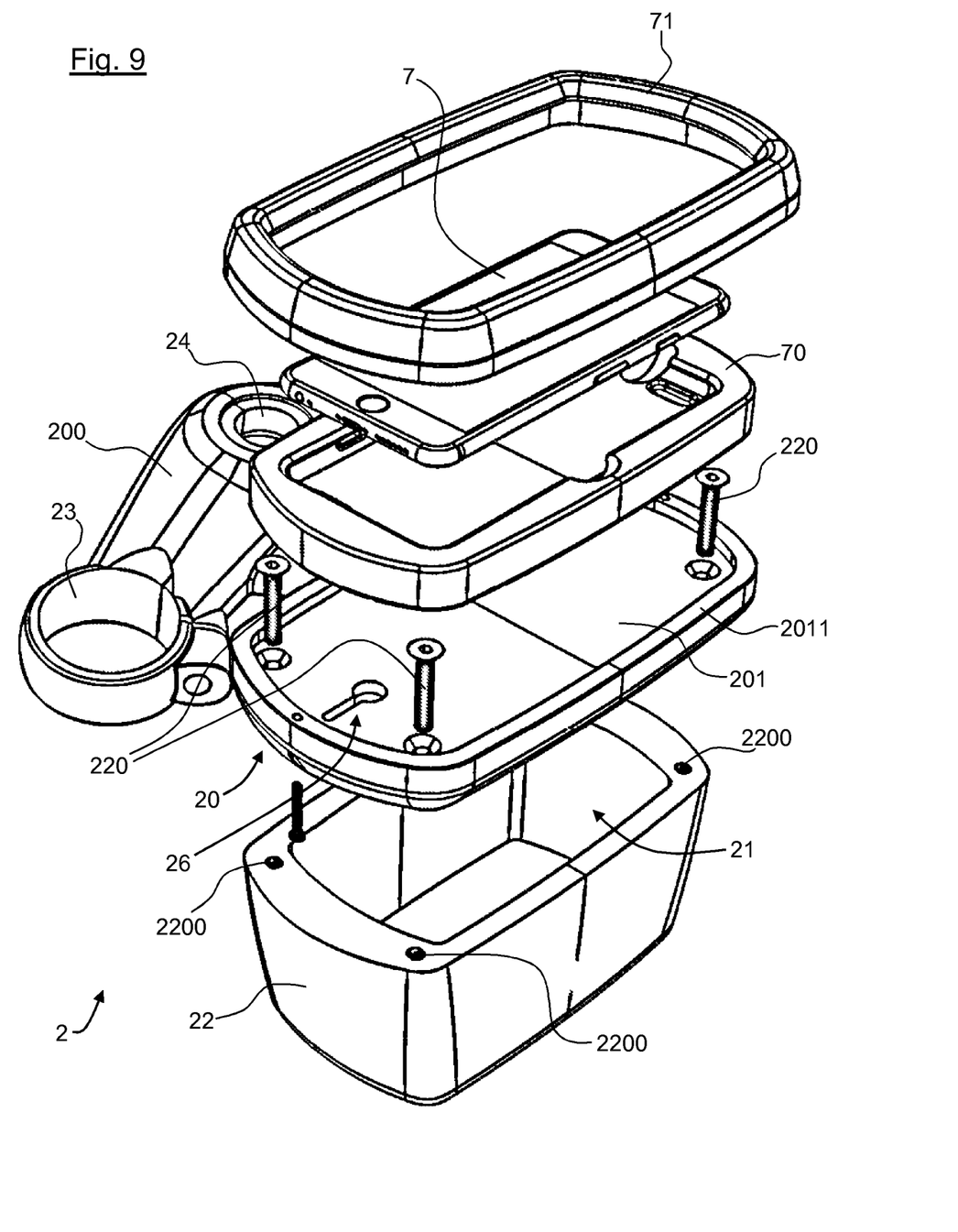
FIGS. 9 and 10 are schematic representations according to exploded views of the body of a fork crown according to the second embodiment.

During the implementation of the cover, the latter must be returned on this lower peripheral edge 2010, then, such as illustrated by FIG. 9, complementary screws 220 with tapped holes 2200 located on the cover 22 are used to fix the cover to the body 20 of the fork crown. These screws are in particular screwed from an upper face of the remote portion 201 of the fork crown 2.

According to the principle of an exemplary embodiment of the invention, an electronic board (not represented) is housed in the cavity. This electronic board is able to centralise and/or process data supplied by said electronic component(s), and comprises control means coupled with at least one member of the motorised vehicle, the control means being able to start, and/or stop and/or modify the performance of the member from the electronic board.

Such as illustrated by FIGS. 9 and 10, the remote portion 201 of the body 20 has a second communication passage 26 between the cavity 21 and a space located above the body 20 of the fork crown 2.

Figure 7:
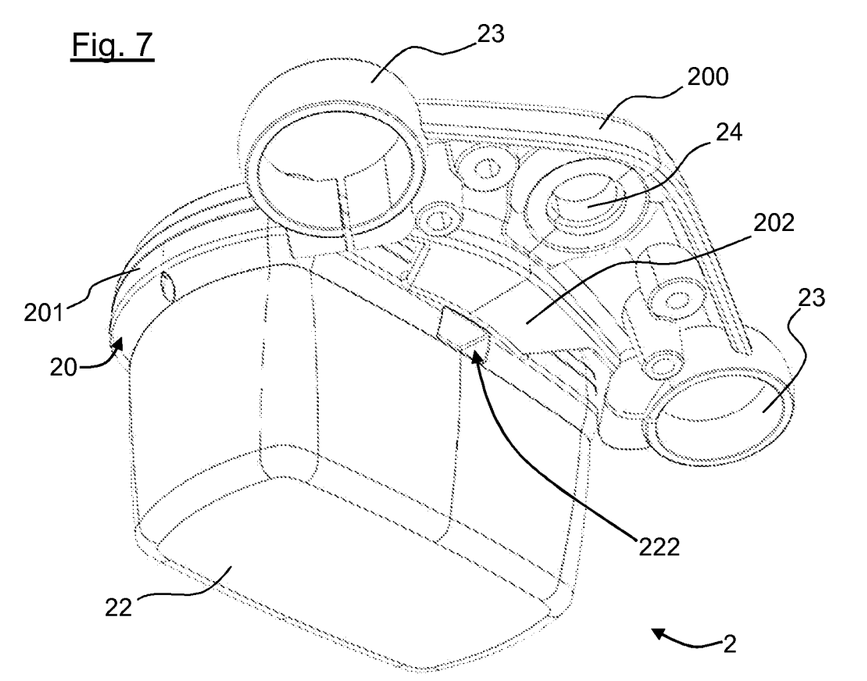
FIGS. 7 and 8 are schematic representations according to perspective views of the body of a fork crown according to a second embodiment.

In reference to FIGS. 7 and 10, the fork crown 2 has a communication opening 222 in particular able to let connection cables intended to connect the electronic board to the electronic components located on the motorised vehicle pass through. Different from the first embodiment, this communication opening 222 is presented by the remote portion 201 of the body 20 and not by the cover 22.

Figure 8:
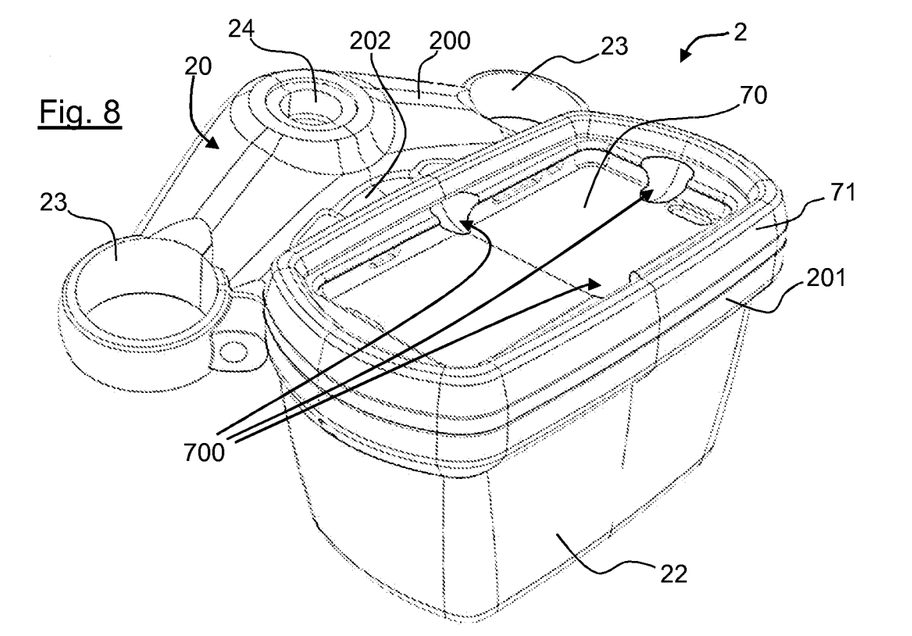

According to FIGS. 8 to 10, the fork crown 2 comprises means for integrating an external computerised unit 7, in particular mobile and communicating, such as a smartphone (telephone). This external computerised unit is intended to engage with the electronic board housed in the cavity, and be used to display information relating to the motorised vehicle by means of the screen of the external computerised unit.

This external computerised unit 7 can, for example, be used to be used as a digital speedometer.

These means for integrating the external computerised unit 7 comprise:
- an upper face of the remote portion 201 of the body 20 of the fork crown;
- a support for receiving 70 the external computerised unit 7;
- a cover 71.

The upper face of the remote portion 201 of the body 20 has a complementary upper peripheral edge 2011 of the cover 71.

Such as illustrated by FIG. 10, complementary assembly screws 710 with holes 711 located on the cover 71 make it possible to assemble the cover on the remote portion 201 of the body 20 of the fork crown 2.

The receiving support 70 is received in a reinforcement presented by the upper face of the remote portion 201, this reinforcement being more specifically delimited by the upper peripheral edge 2011.

The receiving support 70 is specific to the external computerised unit 7 and has, for this purpose, a complementary imprint of the form of the external computerised unit 7. According to another, non-illustrated embodiment, the receiving support could be able to receive external computerised units of different forms by having a sufficiently large deformation capacity.

Such as illustrated in FIG. 8, the receiving support 70 has indentations 700 making it possible to facilitate the removal of the external computerised unit 7 from the receiving support 70.

According to the present embodiment, the receiving support 70 has an elastic deformation capacity. The receiving support 70 is, in particular, made of silicone.

This elastic deformation capacity makes it possible to interlock the external computerised unit 7 inside the imprint.

The elastic deformation capacity of the receiving support 70, as well as the imprint presented by said receiving support form means for holding the external computerised unit 7 in the receiving support 70.

According to a preferable, non-illustrated feature, the fork crown comprises an electrically inductive charger. To this end, the receiving support comprises a housing able to receive an inductive recharging antenna. This recharging antenna is coupled with the electronic board located inside the cavity by way of the second communication passage 26 (illustrated in FIGS. 9 and 10).

The housing is located below the imprint and intended to make it possible for an inductive recharging of the external computerised unit 7.

The cover 71 is hollowed out. It thus makes it possible to insert the external computerised unit into the imprint of the receiving support 70, to access the external computerised unit 7 to interact with, or finally to remove it from the imprint.

During the assembly of the cover 71 on the remote portion 201, the cover confines the receiving support 70 to hold it in position. By confining the receiving support 70, the cover 71 also makes it possible to limit the possible deformations of the receiving support 70 and thus to improve the capacity of the receiving support to hold the external computerised unit 7 inside the imprint.

The cover can be made of aluminium or made of plastic.

According to the present embodiment illustrated by FIG. 8, the remote portion 201 of the body 20 is mainly located in the same plane as the portion 200 of the body 20. The orientation of the screen intended to be presented by the external computerised unit is thus dependent from the orientation of the fork tubes on which the fork crown is assembled.

According to another embodiment, not illustrated, the fork crown can comprise means for modifying the inclination of the screen. To this end, the arm coupling the remote portion to the central portion can have an articulation, or an adapter able to modify the inclination of the screen can be positioned on the upper face of the remote portion, below the receiving support and the cover.

Although this is not described, the first embodiment and the second embodiment can be at least partially combined together.

For example, the cover 22 of the remote portion 201 of the fork crown 2 of the second embodiment (illustrated in FIG. 8) can have a third communication passage 27 with a space located at the front and below the fork crown 2 like for the body 20 of the fork crown 2 of the first embodiment (illustrated in FIG. 6). The fork crown could thus comprise, at the level of this third communication space, a camera intended to film towards the front of the motorised vehicle.

An exemplary embodiment of the invention in particular aims to meet the expectation referred to in the Background section.

More specifically, an exemplary embodiment of the invention proposes a solution making it possible to have a motorised vehicle with a fork crown, which integrate new electronic technologies, in particular in view of communicating or receiving navigation information.

An exemplary embodiment proposes such a solution that does not impact or has little impact on the appearance of the motorised vehicle.

Although the present disclosure has been described with reference to one or more examples, workers skilled in the art will recognize that changes may be made in form and detail without departing from the scope of the disclosure and/or the appended claims.

The invention claimed is:

1. A motorized vehicle comprising:
   a front fork;
   a steering shaft able to rotate inside a steering column;
   at least one fork crown coupled with the steering shaft and with the front fork, wherein the fork crown has a body, in which there is formed a cavity closed by a cover;
   at least one electronic component which collects and/or transmits data relating to operation of the motorized vehicle; and
   an electronic board housed in the cavity and configured to centralise and/or process data supplied by said at least one electronic component, wherein the electronic board comprises:
      a controller coupled with at least one member of the motorized vehicle, the controller being configured to start, and/or stop and/or modify a performance of the at least one member of the motorized vehicle, from the electronic board; and
      a communication module, which is configured to exchange data with an external computerized unit.

2. The motorized vehicle according to claim 1, wherein the electronic board comprises a geolocation element.

3. The motorized vehicle according to claim 1, wherein the electronic board comprises an accelerometer.

4. The motorized vehicle according to claim 1, wherein the motorized vehicle comprises an electrical connection for electrically connecting the electronic board to an electrical supply circuit of the motorized vehicle.

5. The motorized vehicle according to claim 1, wherein the motorized vehicle comprises an emergency battery housed in the cavity, the emergency battery being connected to electrically supply the electronic board.

6. The motorized vehicle according to claim 1, wherein the at least one electronic component belongs to the group consisting of:
   a speed sensor;
   a petrol level sensor;
   a neutral contactor sensor;
   a connector to a diagnostic socket of an embedded computerised unit of the motorized vehicle.

7. The motorized vehicle according to claim 1, wherein the body of the fork crown is single-piece, the body having two housings for coupling and clamping fork tubes, the cavity being located between the coupling and clamping housings.

8. The motorized vehicle according to claim 1, wherein the motorized vehicle comprises a camera integrated in the fork crown and coupled to the electronic board.

* * * * *